Figure 1:
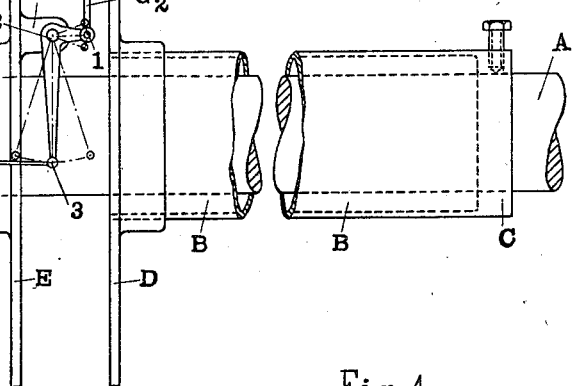

No. 828,731. PATENTED AUG. 14, 1906.
H. FÖTTINGER.
TORSION INDICATOR.
APPLICATION FILED NOV. 4, 1905.

5 SHEETS—SHEET 1.

Witnesses:
C. R. Ferguson
W. M. Avery

Inventor
Hermann Föttinger
By Munn
Attorneys

THE NORRIS PETERS CO., WASHINGTON, D. C.

No. 828,731. PATENTED AUG. 14, 1906.
H. FÖTTINGER.
TORSION INDICATOR.
APPLICATION FILED NOV. 4, 1905.

5 SHEETS—SHEET 2.

Witnesses:
C. R. Ferguson
W. M. Avery

Inventor
Hermann Föttinger
By
Attorneys

No. 828,731. PATENTED AUG. 14, 1906.
H. FÖTTINGER.
TORSION INDICATOR.
APPLICATION FILED NOV. 4, 1905.

5 SHEETS—SHEET 3.

Witnesses:

Inventor
Hermann Föttinger
By
Attorneys

No. 828,731. PATENTED AUG. 14, 1906.
H. FÖTTINGER.
TORSION INDICATOR.
APPLICATION FILED NOV. 4, 1905.

5 SHEETS—SHEET 4.

No. 828,731. PATENTED AUG. 14, 1906.
H. FÖTTINGER.
TORSION INDICATOR.
APPLICATION FILED NOV. 4, 1905.

5 SHEETS—SHEET 5.

Witnesses:
W. M. Avery
C. R. Ferguson

Inventor
Hermann Föttinger
By
Munn & Co
Attorneys

UNITED STATES PATENT OFFICE.

HERMANN FÖTTINGER, OF STETTIN, GERMANY.

TORSION-INDICATOR.

No. 828,731. Specification of Letters Patent. Patented Aug. 14, 1906.

Application filed November 4, 1905. Serial No. 285,850.

*To all whom it may concern:*

Be it known that I, HERMANN FÖTTINGER, a subject of the King of Bavaria, residing at No. 4 Prutz street, Stettin, in the Kingdom of Prussia, Germany, have invented new and useful Improvements in Torsion-Indicators, of which the following is a specification.

My invention relates to an apparatus adapted to determine the rotary moments of power-driven shafts from their torsion in running and transmitting energy, the apparatus being based on the fact that in all qualities of malleable iron or steel the angle or arc of torsion is proportional to the actual rotary moment.

The apparatus, which I designate a "torsion-indicator," includes a tube fixed on the shaft with one end, two plates oppositely connected rigidly to the other end of the tube and the shaft respectively, and lever mechanism for visual or record indication.

The object of my invention is to provide indicating or recording means which multiply the amount of torsion in order to attain a sufficient oscillation of the indicating device, thus rendering distinguishable the size of torsion by a long path or oscillation.

The chief object of the invention is to provide means which secure a high exactness in the readings or records by so arranging the parts that frictional resistance, inertia, and centrifugal moments are minimized or practically avoided, so that only a relatively small force will be required for displacing the measuring and indicating means. Such an operation is of high importance, in consideration of the necessity to multiply the torsional arc of the shaft, which, in practice, amounts to only 1.5 to 2.5 millimeters, from thirty-five to sixty times in order to obtain a sufficient oscillation or stroke of the indicating means of about eighty to one hundred millimeters. This is especially so when the shaft runs at high velocities, as in the case of steam-turbines, for example, because the lever mechanism is then submitted to centrifugal force, so that the pivots are severely loaded.

A further object of the invention is to provide means placed at the side of the shaft, non-rotating, which means enable to put the indicating device into or out of operation, as required.

I attain these objects by placing some parts of the multiplying appliance outside the shaft stationary, while arranging the rotating parts serving for multiplication of the torsional arc partially or completely balanced. Besides, means are provided capable of operating and rotating or axially displacing the indicating or recording apparatus. When using low velocities, both multiplying parts may rotate with the shaft and only one of the same may be balanced, while the recording means may be operated by gears situated outside the shaft.

Figure 2:
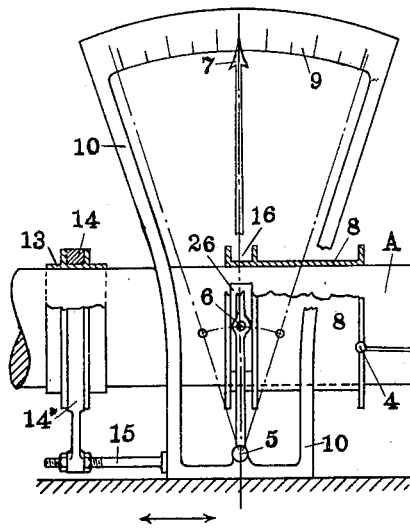
Figure 3:
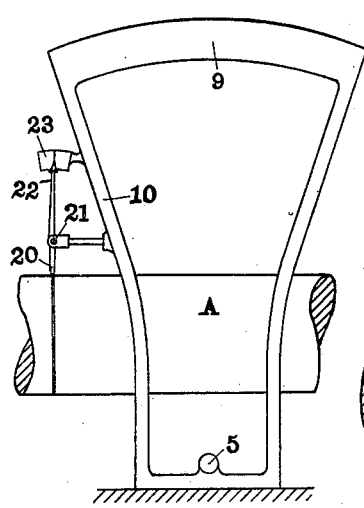
Figure 4:
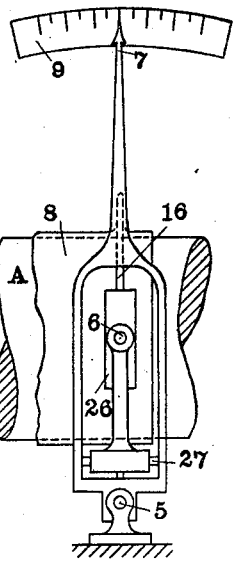
Figure 4:
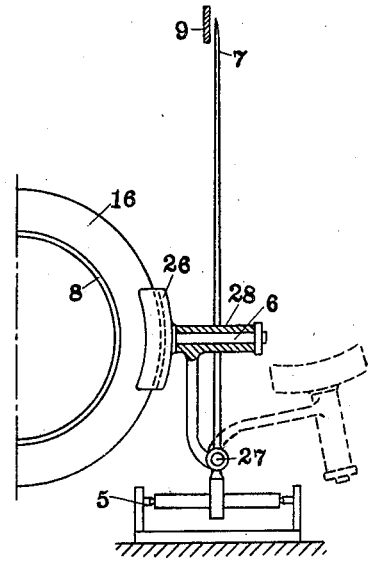
Figure 5:
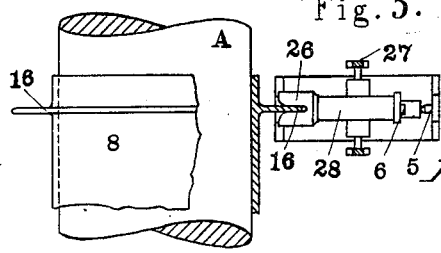
Figure 6:
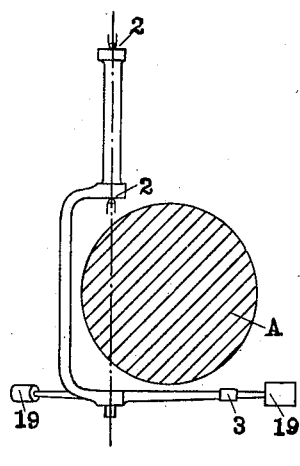
Figure 8:
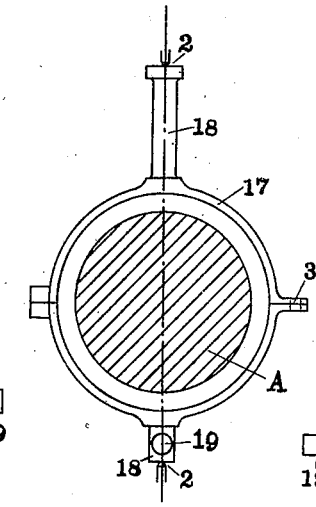
Figure 10:
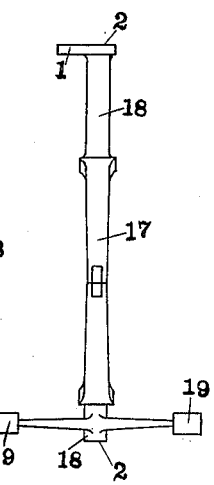
Figure 7:
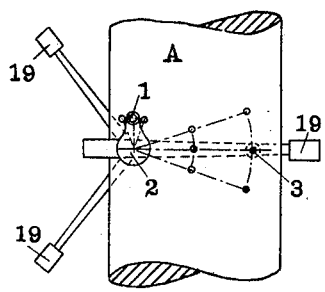
Figure 9:
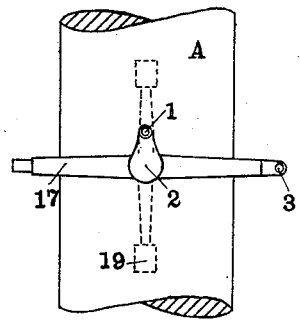
Figure 11:
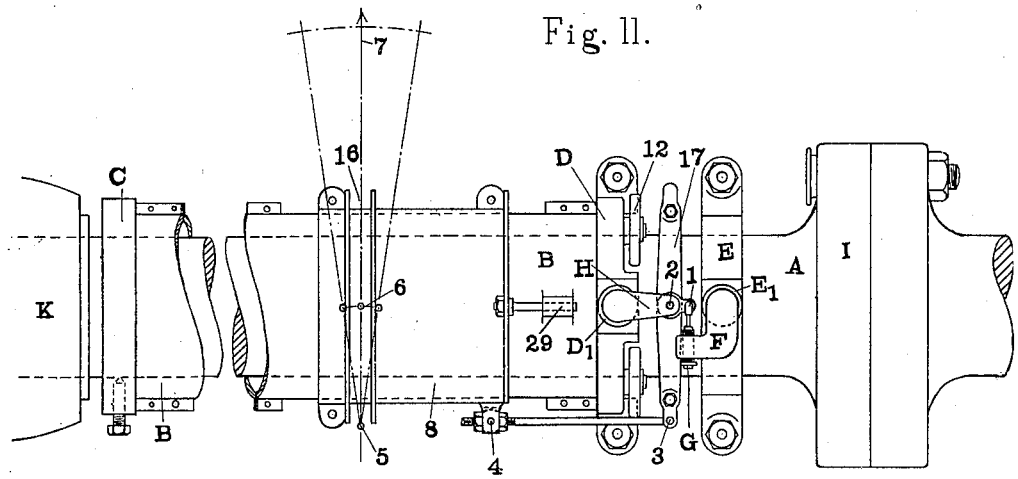
Figure 12:
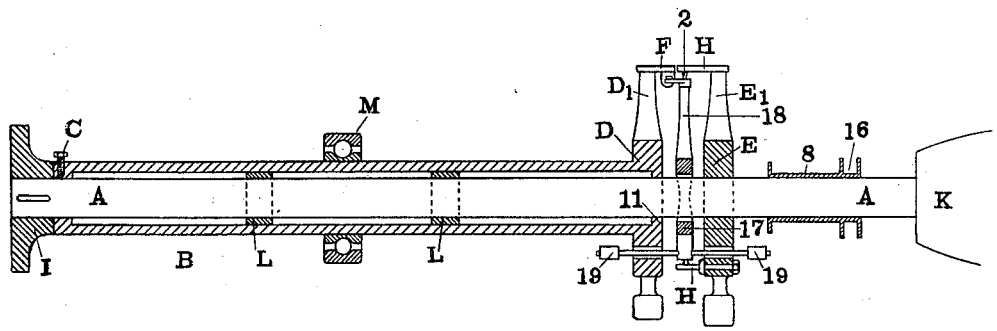
Figure 13:
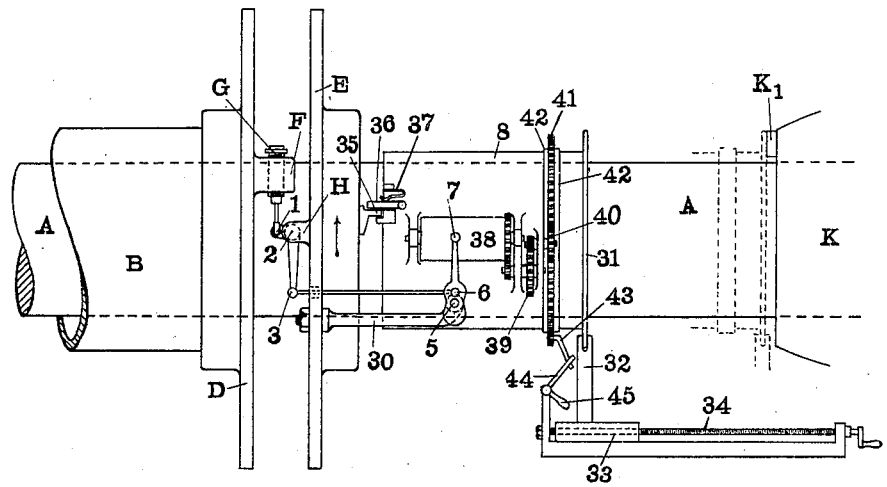
Figure 14:
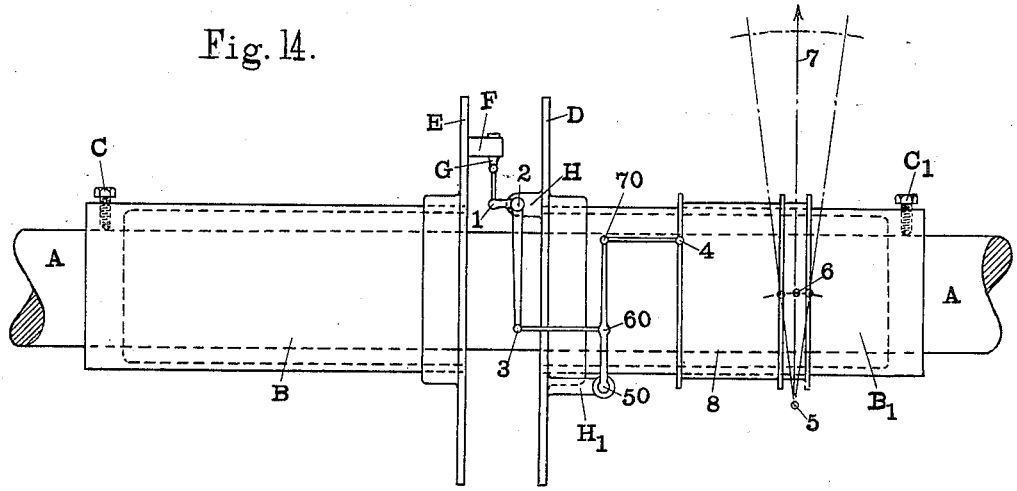
Figure 15:
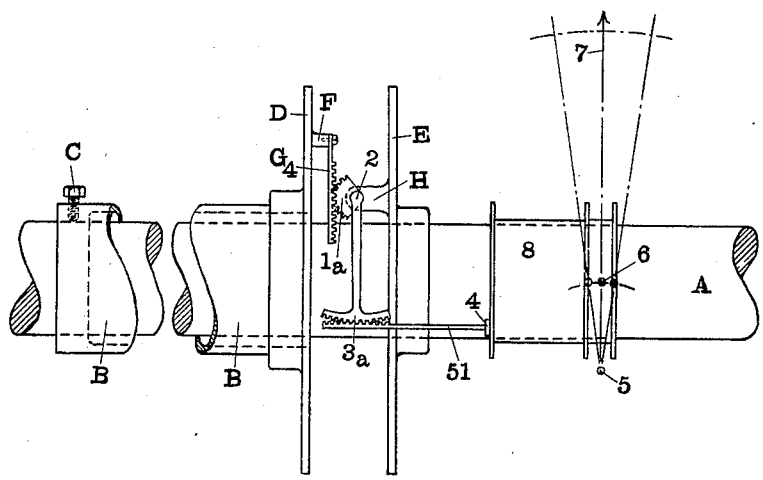

In the accompanying drawings, which form a part of this specification, Figure 1 is a side elevation of an indicating apparatus for high velocities. Fig. 2 is a modification of a detail of the apparatus. Figs. 3, 4, and 5 represent in front elevation, side elevation, and horizontal sectional view, respectively, a device for disconnecting the indicating-needle from the rotating part of the apparatus. Figs. 6 and 7 show in a side elevation and top view, respectively, a multiplying-lever of the apparatus, which is partially balanced. Figs. 8, 9, and 10 represent in side elevation, top view, and front elevation, respectively, a multiplying-lever completely balanced. Fig. 11 is a top view of a modification of the apparatus. Fig. 12 is a longitudinal sectional view of a further modification. Fig. 13 is a top view of a recording apparatus. Fig. 14 is a diagrammatic side elevation of a modification of the apparatus having two opposite tubes, and Fig. 15 is a side elevation of a further modification of the multiplying mechanism.

Similar characters of reference designate similar or equivalent parts throughout the several views of the drawings.

Referring first to the apparatus illustrated in Fig. 1, A designates the power-transmitting shaft, the torsion, and therefore the rotary moments, of which are to be measured. The indicating apparatus comprises a tube B, fixed with one end at C by a set-screw or other suitable means upon the shaft, also two plates, one of which, D, is fixed upon the other end of the tube, the second, E, opposite to it on the shaft A or upon a similarly-arranged tube, as represented in Fig. 14, and the indicating device composed of lever mechanism and connected with the plates which actuate the said levers. The free end of the tube B, with the plate D, may be concentrically guided on the shaft by an inwardly-projecting flange 11, Fig. 12, or by adjustable rollers 12, Fig. 11.

The mechanism serving for multiplying the torsional arc or angle consists of two parts, of which one (part I) rotates with the shaft, while the second (part II) effecting further multiplication and showing or recording the multiplied torsional arc upon a scale or a recording-surface is arranged stationary outside the shaft. Therefore only the stationary-arranged indicator blade or point effects the requisite large stroke, while only that part of the multiplying device which procures the first multiplication and having a comparatively minute oscillation rotates with the shaft and is submitted to the vibration and to centrifugal force which is always inherent in movement on the shaft with high velocities—in steam-turbines or ship's engines, for instance.

The first multiplying part consists of a two-armed lever 1 2 3, pivotally fixed at 2 on a lateral projection H of the plate E. The shorter arm is hinged at 1 to a rod G² of an adjustable micrometer device arranged in an eye F of the plate D. The said device comprises a sleeve G, provided with screw-threads on its outer face and engaging corresponding female screw-threads in the eye F. In the sleeve G a bolt G', connected with the rod G², is contained and secured by convenient means in such a manner that the sleeve may be revolved around the bolt, but axial movement with respect to each other being prevented. Consequently when the sleeve G is screwed forward or backward in the eye F it carries the bolt G', and the rod G² with it, axially in the same direction. By these means the adjustment or testing of the apparatus is enabled. If the torsional arc is small, the elasticity of the rod G² will allow the relative displacement of the lever 1 2 3 and the connecting device G; but any other suitable connection may be used.

The longer arm of the above-mentioned multiplying-lever is hinged at 3 to one end of a rod, the other end of which is connected at 4 by means of a joint with a sleeve 8, capable of sliding axially on the shaft A, Fig. 1, or on the tube B, Fig. 11, and guided thereon by suitable guides, such as shown at 29, Fig. 11, for example, in order to prevent circumferential displacement of the sleeve on its carrier.

Between two flanges of the sleeve 8 an annular groove 16 is formed in which is placed a slide-piece 26, (similar to that of a governor,) a roller, or the like, pivoted at 6 to a lever 5 to 7. This lever, which is the second multiplying part, is mounted outside the shaft in a carrier or standard 10, bearing an indicating-scale 9, over which travels a hand or index 7, arranged at the free end of the lever 5 6 7. This arrangement of the two parts has the advantage to reduce the displacement of the heavy sleeve and the friction caused thereby to a minimum, which, owing to the minute useful path, (equal to the torsional arc 1.5 to 2.5 millimeters,) is here indispensable.

Instead of or besides the index 7 a recording-stylus may be attached to the lever 5 6 7, which stylus travels over a cylinder rotated through the shaft A by means of a belt or gear-wheels, or time-driven, so that visual indications by the index or a diagrammatic record by the stylus, or both, may be obtained.

In order to compensate for axial displacements of the shaft, such as may be caused through the thrust of turbines or propellers, the scale-carrier 10, with the lever-bearing 5, may be displaced on a carriage arrangement in the same sense as the shaft. This may be effected by hand or, as shown in Fig. 1, automatically by the shaft itself, owing to the fact that in an annular groove 13 on the shaft a sliding collar 14 is axially moved with the shaft and displaces the standard 10 by means of a rod 15.

When the displacement is effected by hand, the required amount of the same or the reëstablishment of the proper relative position of shaft and scale-carriage 10 may be read upon an auxiliary indicating device, Fig. 2, fixed upon the scale-carriage. This consists of the lever 20 21 22 with unequal arms, the point 20 being placed in a fine circumferential slot on the shaft, while the point of rotation 21 is connected with the carriage 10. The longer arm 21 22 shows the axial displacement of the shaft magnified on an auxiliary scale 23, and after the carriage has been correctly adjusted the point 22 must always rest upon the zero of the scale.

In accordance with another method of carrying the invention into practice the kinematic connection between the rotary part 1 2 3 and the stationary mounted part 5 6 7 of the multiplying mechanism or the means for serving to their connection may be arranged in such a manner that it may be released for the purpose of obviating constant wear of the said means and of the multiplying mechanism. A number of views of a device of this kind are given in Figs. 3 to 5 for the case in which the kinematic connection is obtained by means of a sleeve 8 and a sliding part 26, sliding against it with a slot formed in it and embracing a rib or flange 16 of the sleeve. The sliding part 26, which is connected with the second multiplying device, may in this case be separated from the constantly-rotating sleeve 8 by turning it over around the spindle 27, as shown by dotted lines in Fig. 4. The arm carrying the sliding piece 26 is provided at its free end with a bearing 28, in which a bolt 6, attached to the block 26, is journaled, so that the block 26 is enabled to maintain its vertical position when the lever 5 to 7 moves forward and backward with the sleeve 8.

In order to permit of utilizing the arrangement even with the highest velocities, the part of the device arranged on the shaft may be quite or approximately balanced—for example, by arranging all large transmission parts (such as levers, gear-wheel spindles, roller-spindles, and the like) in such a manner that their center of gravity falls in the center of the shaft and even when oscillations occur is only separated therefrom to an exceedingly small extent. By this means any one-sided pressure on the pivots and the friction resulting from the same is entirely prevented.

Figs. 6 and 7 show a constructional form of a lever-shaft which is balanced for almost any position by means of counterweights 19. The lever is supported at three points of its axis of oscillation and partly surrounds the shaft A. Its center of gravity moves but minutely out of the axis of rotation of the shaft when the lever is operated, as shown in Fig. 7.

Figs. 8 to 10 illustrate an example for a completely-balanced lever-shaft, the center of gravity of which remains in the axis of rotation at all positions of the lever. In this constructional form the lever consists of a ring 17, encircling the shaft A and provided with diametrically arranged arms 18, of which the shorter one bears counterweights 19 for balancing purposes. The lever is pivoted at two or more points 2 on the projections H of one of the plates, Figs. 11 and 12. If it is desired to utilize the whole length of the portion of a shaft located between a bearing K and a flange I or between two bearings or two flanges, the sleeve 8 may be arranged on the tube B, Fig. 11, in which case the lever 1 2 3 must be pivoted on the plate D, while the adjusting and connecting parts G are attached to the plate E. The multiplying part 5 6 7 is but diagrammatically shown in Fig. 11, and it may be of any convenient construction, such as illustrated in Figs. 1 to 5, for example. With high velocities and thin shafts, such as employed for turbines and electromotors, flexure and shaking of the shaft often occur, the vibration thereby being transmitted to the multiplying device. In order to avoid these defects, by raising the critical number of revolutions the tube B may serve for supporting the shaft A. As illustrated by Fig. 12, to this end the tube can be made very strong, so that it is capable of supporting the shaft by means of guiding or bearing rings L, inserted between the tube and the shaft. If required, the tube may be carried by a bearing, such as the ball-bearing M illustrated, for example, for the purpose of further strengthening the construction, thereby further raising the critical number of revolutions. Instead of the two plates above mentioned rings D and E may be used for the same purpose, having radial arms D' and E', respectively, on which arms the first multiplying parts may be arranged, as above described. The said rings, as well as the body 17 of the lever 1 2 3, the tube B, and the sleeve 8, are preferably formed in two halves and bolted together after having been mounted around the shaft, so that the apparatus can be readily brought in place upon any shaft without requiring alteration of the power-transmitting parts, which arrangement may be easily understood from Fig. 11.

Fig. 13 represents a recording apparatus for shafts rotating with low velocities, but having important variations of the amount of the rotary moment with every revolution, as with shafts driven by piston steam-engines, so that exact readings cannot be obtained by an index, owing to the constant oscillation of the same, and a diagrammatic record must be made. In this constructional form the whole multiplying device rotates with the shaft, while the record-surface is driven by means situated outside the shaft in repose, whereby provision is taken to rotate the record-surface with such a velocity that the velocity with which the stylus slides over the said surface is comparatively low, so as to give correct records. The lever 5 6 7 of the second multiplying part is counterweighted and pivoted at 5 on a bar 30, projecting from the plate E, and the connecting-rod fixed to the first lever at 3 is hinged directly to the said lever at 6. A stylus attached to the free end 7 of the said lever rests on a record-cylinder 38, mounted in bearings on the sleeve 8 and provided with a gear meshing with a number of consecutive intermediate gears 39, the last of which, 40, meshes with a toothed rim 41, loosely arranged between two flanges 42 of the sleeve 8, a free circumferential movement between the said rim 41 and the sleeve 8 therewith being enabled. A finger or stud 43 is affixed to the rim 41, which stud can be arrested by a stop 44 moved in its path, whereupon the gear-wheel 40 rolls on the fixed rim 41 when the sleeve 8 is rotated with the shaft, thereby also rotating the record-cylinder 38 by means of the intermediate gears 39 with reduced velocity. The means for rotating the sleeve 8 consist of a finger 35, projecting from the plate E, and of a spring-pressed lever 36, affixed to the sleeve 8, which parts are in operative engagement when the sleeve is in its left end position. (Shown in the drawings.) The shaft A and the plate E, rotating in the direction of the arrow, carry with them the sleeve by means of the described clutch. The sleeve 8 is also provided with a flange 31, which is loosely embraced by the forked end of an arm 32, mounted upon a carriage 33, which is movable lengthwise on guides by the mediation of a crank-ended screw-spindle 34. When the carriage 33 is moved to the right, it draws the sleeve in the same direction and presses its flange 31 against a projection K' of the bearing K, as shown by dotted lines, so that the sleeve will no more be rotated by the frictional contact between the sleeve and the shaft. In this position of the sleeve a new record-sheet may be affixed to the record-cylinder, which sheet is suitably ruled in the usual manner to indicate the respective coördinate results. When the sleeve is returned to the left and reaches its end position, the stud 35 strikes the lever 36, cushioned by the spring 37, thereby interlocking the sleeve with the plate E without shock. The stop 44 may be either stationary, so that the rim 41 is prevented from rotation as soon as the sleeve is in its left end position, or adapted to be swung into or out of its operative position by means of a handle 45 or the like, as desired.

In the modification shown in Fig. 14 two tubes B B' are employed, fixed with their outer ends at C C', respectively, in the above-described manner, their inner or opposite ends carrying the plates E and D, respectively. It is obvious that the amount of torsion of the shaft A between the points C and C' is indicated in the same manner with a single tube, as indicated in Fig. 1, or with the two tubes B and B'. In the multiplying mechanism here represented a second multiplying-lever 50 60 70, pivoted at 50 on a bracket H', projecting from the plate D, is employed, which lever is capable of further multiplying the oscillation of the lever 1 2 3 by being connected at 60 with the said lever by means of a link, its magnified oscillation being transmitted to the sleeve 8 through a link connection between the free end 70 of this lever and the point 4 of the sleeve 8. In place of lever mechanism any other suitable positive transmitting means may be used, for example, as shown in Fig. 15, rack-bars G⁴ and 51 and toothed sectors 1ᵃ and 3ᵃ, respectively, meshing with one another.

I have disclosed several constructional forms of the apparatus in the accompanying drawings for purpose of examples; but obviously the device may be varied in different ways without departing from the principle of my invention. Also combinations of the parts shown in the different figures may be made. I therefore do not wish to be limited to the illustrated constructional apparatus; but What I broadly claim as my invention, and desire to secure by Letters Patent, is—

1. In an apparatus for determining the rotary moments of shafting, the combination with a shaft, of a tube fixed with one end upon the shaft, two plates oppositely arranged upon the free end of the tube and upon the shaft respectively, means connected with the plates and adapted to multiply the relative rotary displacement of the plates, means for further multiplying and showing the amount of the rotary displacement, said means being located outside the shaft, and means for operatively connecting the two multiplying parts, substantially as described.

2. In an apparatus for determining the rotary moments of shafting, the combination with a shaft, of a tube fixed with one end upon the shaft, two plates oppositely arranged on the free end of the tube and upon the shaft respectively, means rotating with the shaft and adapted to multiply the relative rotary displacement of the two plates, means for further multiplying the said displacement arranged stationary, and means for operatively connecting the two multiplying parts, substantially as described.

3. In an apparatus for determining the rotary moments of shafting, the combination with a shaft, of a tube fixed with one end upon the shaft, two plates oppositely arranged upon the free end of the tube and upon the shaft respectively, a two-armed lever pivoted on one of the plates, means for connecting the shorter arm of the said lever with the other plate, a second multiplying-lever arranged outside the shaft and swinging over a scale, and means for operatively connecting the two multiplying parts, substantially as described.

4. In an apparatus for determining the rotary moments of shafting, the combination with a shaft, of a tube fixed with one end upon the shaft, two plates oppositely arranged upon the free end of the tube and upon the shaft respectively, a two-armed lever pivoted on one of the plates, means for connecting the shorter arm of the said lever with the other plate, a second multiplying-lever arranged outside the shaft and swinging over a scale, and a sleeve axially displaceable on the shaft by the longer arm of the rotating multiplying-lever, said sleeve being operatively engaged with the stationary lever, substantially as described.

5. In an apparatus for determining the rotary moments of shafting, the combination with a shaft, of a tube fixed with one end upon the shaft, two plates oppositely arranged upon the free end of the tube and upon the shaft respectively, a two-armed lever pivoted to one of the plates, means for connecting the shorter arm of the said lever with the other plate, a second multiplying-lever arranged outside the shaft and swinging over a scale, and a sleeve axially displaceable by the longer arm of the rotating multiplying-lever, said sleeve being operatively engaged with the stationary-arranged lever by means adapted to connect or release the two parts, substantially as described.

6. In an apparatus for determining the rotary moments of shafting, the combination with a shaft, of a tube fixed with one end upon the shaft, two plates oppositely arranged upon the free end of the tube and upon the shaft respectively, means connected with the plates and adapted to multiply the relative rotary displacement of the plates, means for further multiplying and showing the amount of the rotary displacement, said means being located outside the shaft on a carriage adapted to be moved in conformity with the axial thrust of the shaft, and means for operatively connecting the two multiplying parts, substantially as described.

7. In an apparatus for determining the rotary moments of shafting, the combination with a shaft, of a tube fixed with one end upon the shaft, two plates oppositely arranged upon the free end of the tube and upon the shaft respectively, means connected with the plates and adapted to multiply the relative rotary displacement of the plates, means for further multiplying and showing the amount of the said rotary displacement, a carriage adapted to be displaced lengthwise and bearing the second multiplying mechanism, connecting means between the shaft and the carriage capable of automatically displacing the latter in conformity with the axial movement of the shaft, and means for operatively connecting the two multiplying parts, substantially as described.

8. In an apparatus for determining the rotary moments of shafting, the combination with a shaft, of a tube fixed with one end upon the shaft, guiding or bearing means interposed between the shaft and the tube at several places and at the ends of the tube, two plates oppositely arranged upon the free end of the tube and upon the shaft respectively, and means adapted to multiply and show the amount of the relative rotary displacement of the plates, substantially as described.

9. In an apparatus for determining the rotary moments of shafting, the combination with a shaft, of a tube fixed with one end upon the shaft, guiding or bearing means interposed between the shaft and the tube, bearing means for supporting the tube, two plates oppositely arranged upon the free end of the tube and upon the shaft respectively, and means adapted to multiply and show the amount of the relative rotary displacement of the plates, substantially as described.

10. In an apparatus for determining the rotary moments of shafting, the combination with a shaft, of a tube fixed with one end upon the shaft, two plates oppositely arranged upon the free end of the tube and upon the shaft respectively, a two-armed lever pivoted on one of the plates, counterweights adapted to balance the said lever in such a manner that its center of gravity falls in the axis of rotation of the shaft and is maintained therein as far as practicable when the lever oscillates, means for connecting the shorter arm of the said lever with the other plate, a second multiplying mechanism, and means for operatively connecting the two multiplying parts, substantially as described.

11. In an apparatus for determining the rotary moments of shafting, the combination with a shaft, of a tube rigidly fixed thereon, a plate fixed on the tube, an opposite plate fixed on the shaft, means rotating with the shaft, operating to multiply the relative rotary displacement of the plates, and stationary devices for further multiplying said displacements, substantially as described.

12. In an apparatus for determining the rotary moments of shafting, the combination with a shaft, of a tube fixed with one end upon the shaft, two plates oppositely arranged upon the free end of the tube and upon the shaft respectively, means adapted to multiply the relative rotary displacement of the two plates and bearing a record-stylus, a record-cylinder rotatably mounted on a sleeve interlocked with the shaft, and a stationary or arrested device for driving the record-cylinder with reduced velocity, substantially as described.

In testimony whereof I have signed my name to this specification in presence of two subscribing witnesses.

HERMANN FÖTTINGER.

Witnesses:
HEINRICH DENTLER,
HANS HILDEBRAND.